(12) United States Patent
Syed et al.

(10) Patent No.: US 12,401,635 B2
(45) Date of Patent: Aug. 26, 2025

(54) AUTOMATICALLY GENERATING TASK-BASED AND LIMITED-PRIVILEGE USER SECURITY CREDENTIALS

(71) Applicant: Dell Products L.P., Round Rock, TX (US)

(72) Inventors: Farhan Syed, Bangalore (IN); Deepaganesh Paulraj, Bangalore (IN); Douglas J. Roberts, Cedar Park, TX (US); Colby Harper, Austin, TX (US); Jason C. Dale, Cedar Park, TX (US); Jun Gu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 365 days.

(21) Appl. No.: 17/968,301

(22) Filed: Oct. 18, 2022

(65) Prior Publication Data

US 2024/0129294 A1 Apr. 18, 2024

(51) Int. Cl.
*H04L 9/40* (2022.01)
(52) U.S. Cl.
CPC ............ *H04L 63/083* (2013.01); *H04L 63/20* (2013.01)
(58) Field of Classification Search
CPC .............................. H04L 63/083; H04L 63/20
See application file for complete search history.

(56) References Cited

U.S. PATENT DOCUMENTS

| | | | |
|---|---|---|---|
| 9,397,989 B1* | 7/2016 | Ramalingam | ........... H04L 63/08 |
| 10,868,836 B1 | 12/2020 | Yancey et al. | |
| 11,468,721 B2 | 10/2022 | Conrad et al. | |
| 11,470,079 B1 | 10/2022 | Kurani et al. | |
| 2012/0239917 A1* | 9/2012 | Springfield | ........... G06F 21/575 |
| | | | 713/2 |
| 2013/0332575 A1* | 12/2013 | Song | ................... H04L 67/1097 |
| | | | 709/219 |

* cited by examiner

*Primary Examiner* — Farid Homayounmehr
*Assistant Examiner* — Suman Debnath
(74) *Attorney, Agent, or Firm* — Ryan, Mason & Lewis, LLP (57) ABSTRACT

Methods, apparatus, and processor-readable storage media for automatically generating task-based and limited-privilege user security credentials are provided herein. An example computer-implemented method includes processing a request for user security credentials against one or more predetermined security parameters associated with at least one network; generating, based on the processing of the request, at least one set of user security credentials comprising one or more combinations of multiple randomly selected characters; configuring one or more attributes associated with the at least one set of user security credentials in connection with the at least one network, wherein the one or more attributes comprise at least one of one or more task-related attributes and one or more privilege-related attributes; and performing one or more automated actions based on the one or more configured attributes and/or implementation of the at least one set of user security credentials by one or more users.

20 Claims, 8 Drawing Sheets

```
                    // This method initializes the subscriber context
-   int fnmgr_subscriber_init(sub_ctx_t **sub_context, char
    *sub_name,sub_notification_callback notification_callback);
                    // This method subscribes to the notification from DFS
-   int fnmgr_subscribe_notification(sub_ctx_t *sub_context, char *topic);
                    // This method subscribes to the notification from DFS
-   int fnmgr_unsubscribe_notification(sub_ctx_t *sub_context, char *topic);
    s32
-   int32_t CfgGetAttribute(_IN const char *pKey, _OUT char *pValue, _INOUT
    uint32_t *pValueSize);
-   int32_t CfgSetAttribute(_IN const char *pKey, _IN const char *pValue, _IN
    uint32_t cfgFlags,_IN const CfgSourceInfo *pSourceInfo);
```

FIG. 8

800 — PROCESS A REQUEST FOR USER SECURITY CREDENTIALS AGAINST ONE OR MORE PREDETERMINED SECURITY PARAMETERS ASSOCIATED WITH AT LEAST ONE NETWORK

802 — GENERATE, BASED AT LEAST IN PART ON THE PROCESSING OF THE REQUEST, AT LEAST ONE SET OF USER SECURITY CREDENTIALS COMPRISING ONE OR MORE COMBINATIONS OF MULTIPLE RANDOMLY SELECTED CHARACTERS

804 — CONFIGURE ONE OR MORE ATTRIBUTES ASSOCIATED WITH THE AT LEAST ONE SET OF USER SECURITY CREDENTIALS IN CONNECTION WITH THE AT LEAST ONE NETWORK, WHEREIN THE ONE OR MORE ATTRIBUTES COMPRISE AT LEAST ONE OF ONE OR MORE TASK-RELATED ATTRIBUTES AND ONE OR MORE PRIVILEGE-RELATED ATTRIBUTES

806 — PERFORM ONE OR MORE AUTOMATED ACTIONS BASED AT LEAST IN PART ON AT LEAST ONE OF THE ONE OR MORE CONFIGURED ATTRIBUTES AND IMPLEMENTATION OF THE AT LEAST ONE SET OF USER SECURITY CREDENTIALS BY ONE OR MORE USERS

AUTOMATICALLY GENERATING TASK-BASED AND LIMITED-PRIVILEGE USER SECURITY CREDENTIALS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to techniques for enhancing security in connection with such systems.

BACKGROUND

With the introduction of smart network interface card support in servers, factory requirements can often include installing operating systems (OS) on smart network interface card devices. However, because device OS deployment is often a privileged operation, application programming interfaces (APIs) commonly used to accomplish such tasks do not have the necessary credentials to perform the operation. For example, in a given factory environment, a host OS can be installed, but there often is no network connectivity between the host and the external world. Smart network interface card device OS deployment can be attempted in a scenario lacking network connectivity, but typically requires installing a remote access service module on the host. Further, in connection with conventional system management techniques, attempting to use such a service module requires implementing default and/or administrator-level credentials, which creates one or more security vulnerabilities.

SUMMARY

Illustrative embodiments of the disclosure provide techniques for automatically generating task-based and limited-privilege user security credentials. An exemplary computer-implemented method includes processing a request for user security credentials against one or more predetermined security parameters associated with at least one network, and generating, based at least in part on the processing of the request, at least one set of user security credentials including one or more combinations of multiple randomly selected characters. The method also includes configuring one or more attributes associated with the at least one set of user security credentials in connection with the at least one network, wherein the one or more attributes include at least one of one or more task-related attributes and one or more privilege-related attributes. Additionally, the method includes performing one or more automated actions based at least in part on at least one of the one or more configured attributes and implementation of the at least one set of user security credentials by one or more users.

Illustrative embodiments can provide significant advantages relative to conventional system management techniques. For example, problems associated with security vulnerabilities arising from implementing default and/or administrator-level credentials are overcome in one or more embodiments through automatically generating task-based and limited-privilege user security credentials in accordance with one or more security parameters associated with at least one network.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
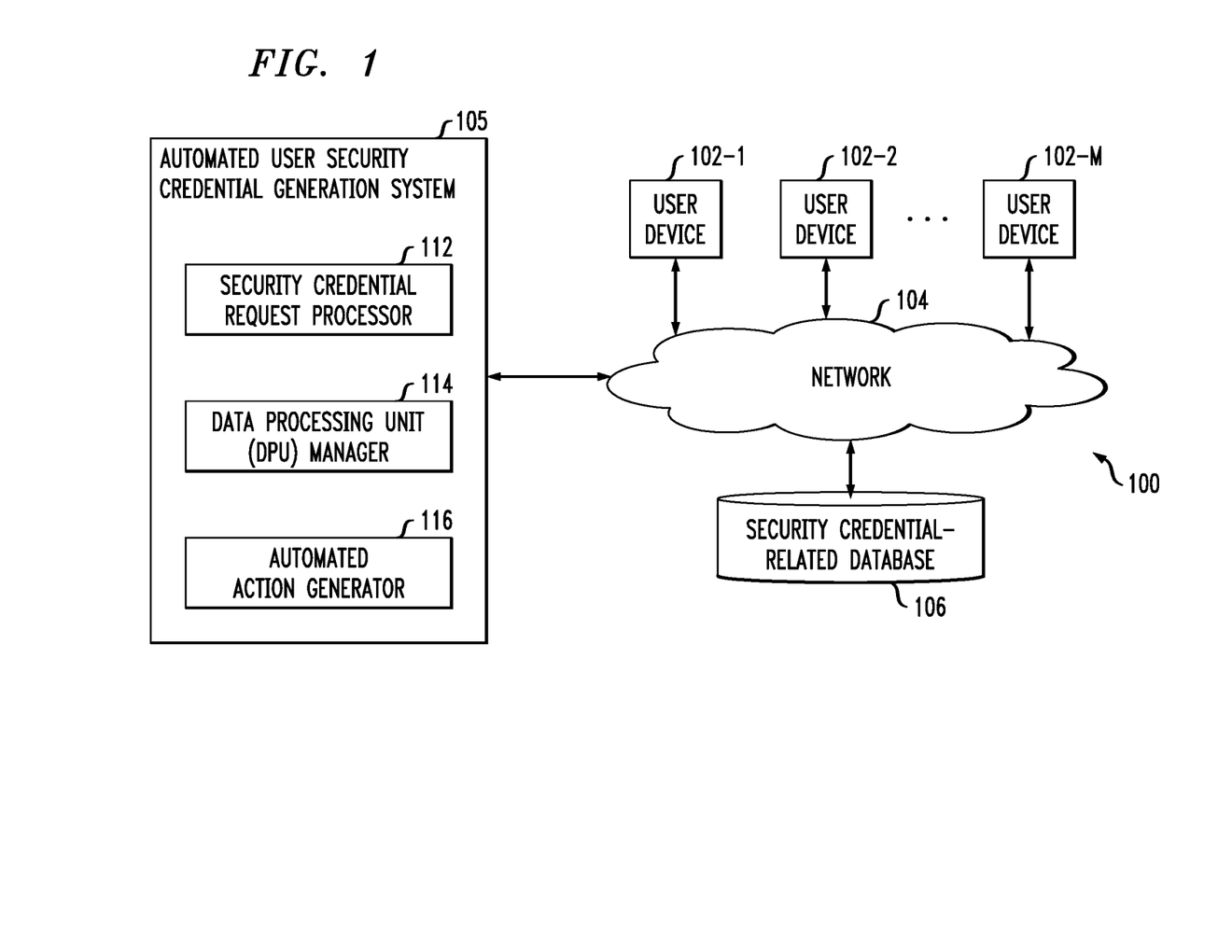
FIG. 1 shows an information processing system configured for automatically generating task-based and limited-privilege user security credentials in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is automated user security credential generation system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, automated user security credential generation system 105 can have an associated security credential-related database 106 configured to store data pertaining to user security credentials, which comprise, for example, one or more task permissions associated with at least one network, user privilege information associated with at least one network, interface information associated with at least one network, etc.

The security credential-related database 106 in the present embodiment is implemented using one or more storage systems associated with automated user security credential generation system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with automated user security credential generation system 105 are one or more input-output devices, which illustratively comprise keyboards, displays or other types of input-output devices in any combination. Such input-output devices can be used, for example, to support one or more user interfaces to automated user security credential generation system 105, as well as to support communication between automated user security credential generation system 105 and other related systems and devices not explicitly shown.

Additionally, automated user security credential generation system 105 in the FIG. 1 embodiment is assumed to be implemented using at least one processing device. Each such processing device generally comprises at least one processor and an associated memory, and implements one or more functional modules for controlling certain features of automated user security credential generation system 105.

More particularly, automated user security credential generation system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows automated user security credential generation system 105 to communicate over the network 104 with the user devices 102, and illustratively comprises one or more conventional transceivers.

The automated user security credential generation system 105 further comprises a security credential request processor 112, a data processing unit (DPU) manager 114, and an automated action generator 116.

It is to be appreciated that this particular arrangement of elements 112, 114 and 116 illustrated in the automated user security credential generation system 105 of the FIG. 1 embodiment is presented by way of example only, and alternative arrangements can be used in other embodiments. For example, the functionality associated with elements 112, 114 and 116 in other embodiments can be combined into a single module, or separated across a larger number of modules. As another example, multiple distinct processors can be used to implement different ones of elements 112, 114 and 116 or portions thereof.

At least portions of elements 112, 114 and 116 may be implemented at least in part in the form of software that is stored in memory and executed by a processor.

It is to be understood that the particular set of elements shown in FIG. 1 for automatically generating task-based and limited-privilege user security credentials involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, automated user security credential generation system 105 and security credential-related database 106 can be on and/or part of the same processing platform.

An exemplary process utilizing elements 112, 114 and 116 of an example automated user security credential generation system 105 in computer network 100 will be described in more detail with reference to the flow diagram of FIG. 8.

Accordingly, at least one embodiment includes creating transient task-based, limited-privilege user accounts and/or user credentials. As used herein, a user account refers to an entity that is defined in connection with a given system and permitted to interact with the given system. Also, as used herein, user credentials are used by a user account to authenticate the user account to the system. At least one embodiment includes enabling OS installation on smart network interface card devices by provisioning transient and/or task-based user security credentials (also referred to herein simply as "user credentials" or "bootstrap credentials").

In one or more embodiments, generating such user credentials includes implementing one or more intelligent platform management interface (IPMI) original equipment manufacturer (OEM) commands. In such an embodiment, IPMI OEM commands can be carried out over at least one keyboard controller style (KCS) interface between the host and a remote access controller. Additionally, such a command, executed from the host OS, can require local administrator rights and/or privileges, which ensures that only a privileged user can successfully execute the command. Further, in at least one embodiment, a bootstrap credentials module, used to generate and/or implement the task-based user security credentials, is disabled by default (e.g., via a remote access controller attribute), and a privileged host OS user needs to explicitly enable the bootstrap credentials module prior to sending a given IPMI OEM command.

As also detailed herein, one or more embodiments can include generating transient, task-based, limited-privilege user credentials by randomly generating alpha-numeric combinations to be used as usernames and/or passwords. In such an embodiment, a unique alpha-numeric combination can be randomly generated for each instance of a given corresponding task and/or for each particular task to be associated with the credentials.

Further, the user security credentials created include and/or encompass limited privileges, and as such, only one or more specific actions can be performed using the credentials. Additionally or alternatively, the user security credentials thus created are transient and can remain active, for example, only until the corresponding task(s) is/are performed and/or until the next server reboot. In one or more embodiments, upon completion of the corresponding task(s) and/or in response to the next server reboot, the user security credentials are deleted (e.g., removed from volatile memory) and the option for implementing such credentials is disabled. At least one embodiment can additionally include implementing a temporal restriction on the created user security credentials, further limiting the ability for such credentials to be used on the basis of time.

In connection with one or more embodiments, when an OS deployment API request is received at a backend, apart from authentication, an additional authorization check is made to determine if the request has originated over a given smart network interface card network interface. Data pertaining to the outcome of this determination is consumed by at least one remote access controller backend API, which initiates one or more authorization decisions based at least in part thereon.

Accordingly, at least one embodiment includes generating and implementing transient task-based user security credentials, wherein such credentials grant access only for the performance of one or more specific and predetermined tasks (such as, for example, installing an OS on a given smart network interface card device). Additionally, in such an embodiment, the generated credentials can be limited for use only over one or more specific remote access controller web interfaces (e.g., Redfish APIs). Further, one or more embodiments include carrying out authorization techniques, in connection with such credentials, which are not limited, for example, to verifying username(s) and password(s), but which can include additional checks such as ensuring that related requests arrive on one or more specific network interfaces. Also, while one or more embodiments detailed herein include the use of OS provisioning, it is to be appreciated that other embodiments can be extended to support other tasks.

In at least one embodiment, a DPU manager implements IPMI bootstrap credentials. As used herein, bootstrap credentials are used by a given system to authenticate one or more bootstrap accounts, wherein a bootstrap account is a user account that is limited to bootstrapping of the given system. In response to an IPMI bootstrap creation request from an IPMI, the DPU manager creates temporary remote access controller user credentials. These credentials can be used by at least one API client (e.g., a Redfish client) on one or more remote access controller uniform resource identifiers (URIs) (e.g., Redfish URIs) for an initial provisioning. In at least one embodiment, the temporary remote access controller credentials will be cleared upon a host reboot.

Also, in one or more embodiments, the DPU manager exposes a DBus method to facilitate bootstrap credential creation. In such an embodiment, the method in question is CreateBootStrapAccount, and DBus is the means by which that method is made available to processes. The IPMI invokes the bootstrap credential creation DBus method when the host operating system (e.g., via the host operating system hypervisor) requests new remote access controller bootstrap credentials over a KCS channel.

Figure 2:
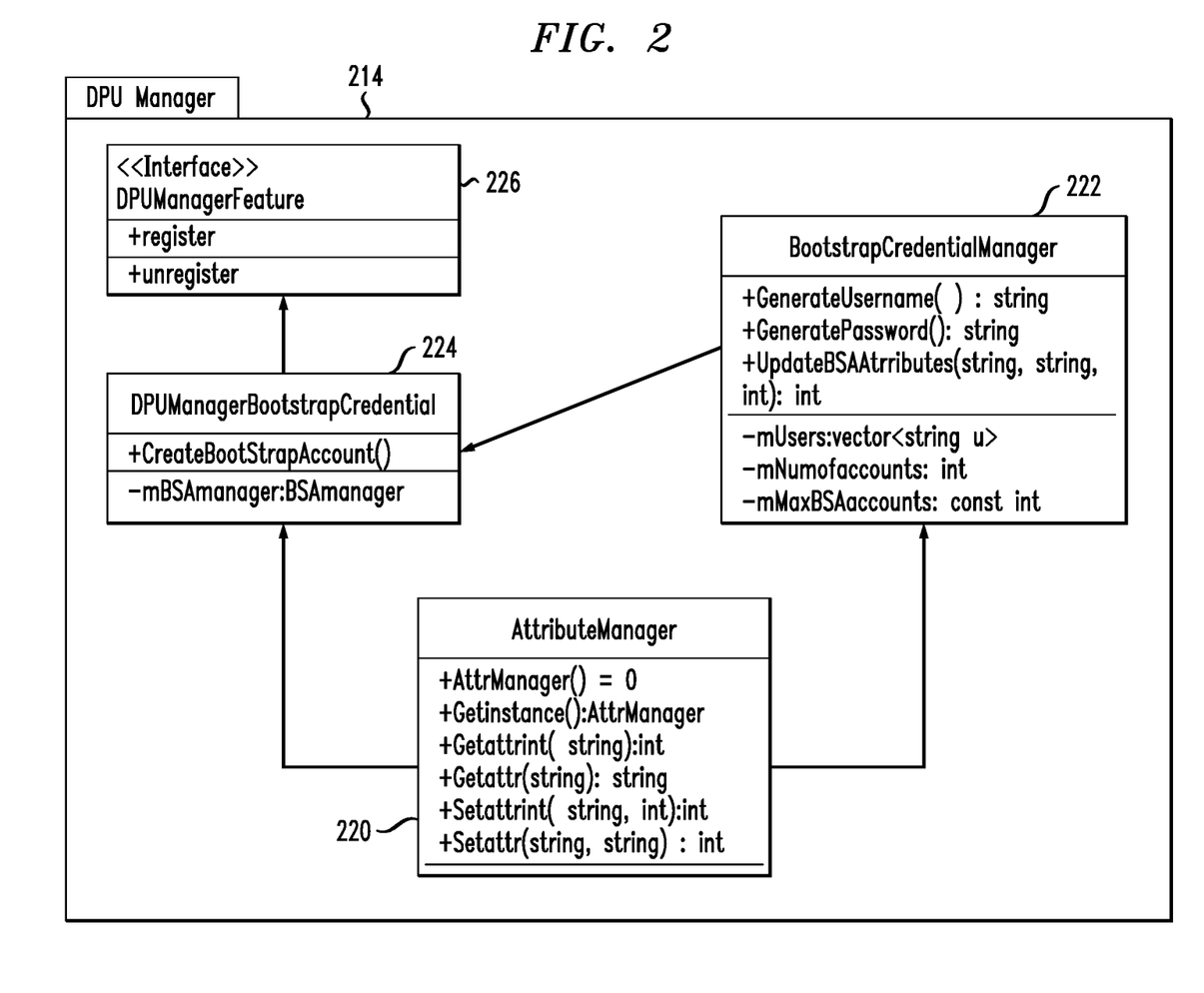
FIG. 2 shows example class diagrams for bootstrap credentials in an illustrative embodiment.

FIG. 2 shows example class diagrams for bootstrap credentials in an illustrative embodiment. By way of illustration, FIG. 2 depicts various classes within DPU manager 214, including an attribute manager class 220, a bootstrap credential manager class 222, a DPU manager bootstrap credential class 224, and a DPU manager feature class 226. Additionally, as depicted in FIG. 2, attribute manager class 220 provides input to bootstrap credential manager class 222 and DPU manager bootstrap credential class 224. Also, bootstrap credential manager class 222 provides input to DPU manager bootstrap credential class 224. Further, as illustrated in FIG. 2, DPU manager bootstrap credential class 224 provides input to DPU manager feature class 226.

Figure 3:
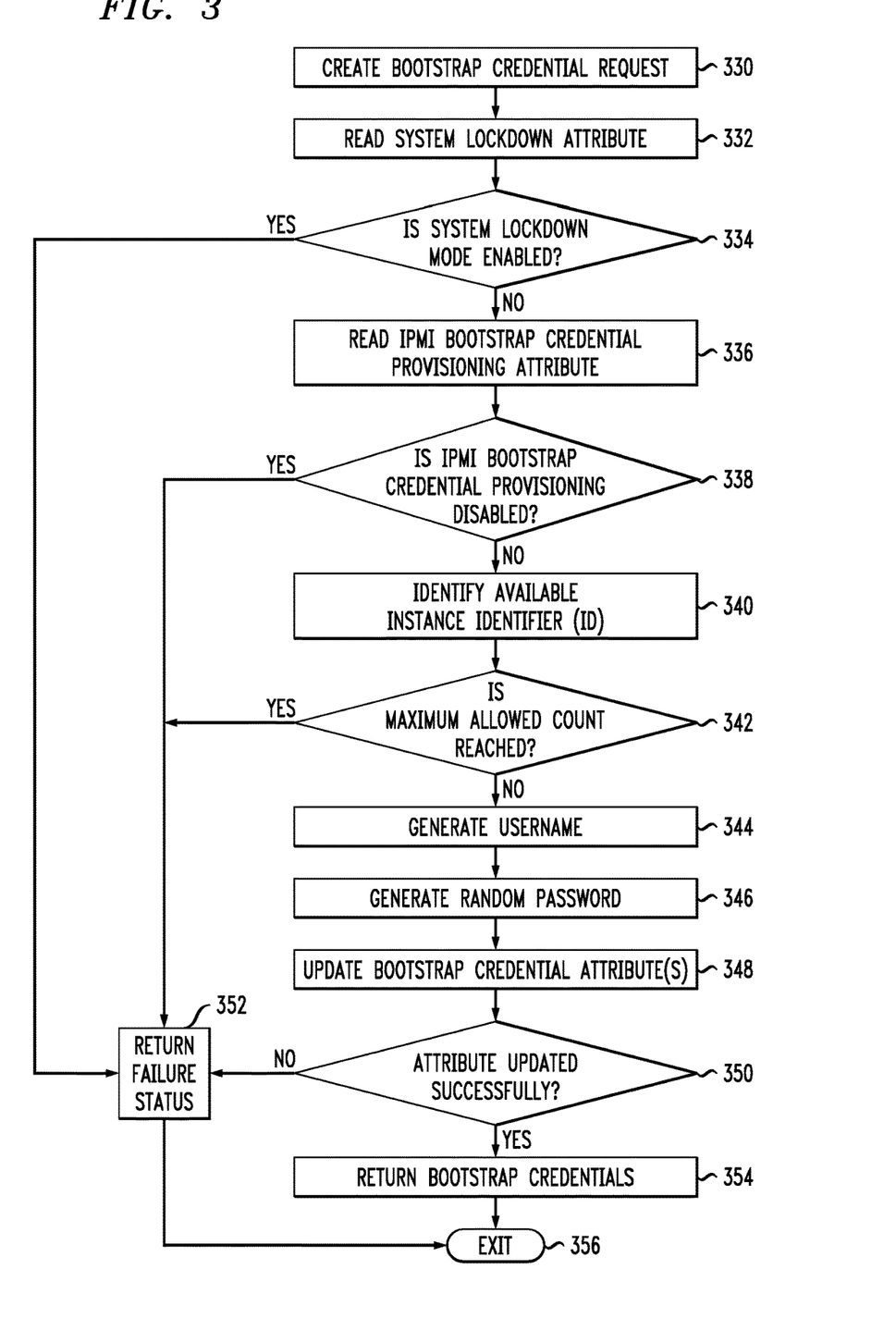
FIG. 3 shows an example workflow for creating bootstrap credentials in an illustrative embodiment.

FIG. 3 shows an example workflow for creating bootstrap credentials in an illustrative embodiment. As depicted in FIG. 3, step 330 includes creating a bootstrap credential request, and step 332 includes reading at least one system lockdown attribute. As used herein, a lockdown mode is a feature on a remote access controller that allows an administrator to prevent or "lockdown" one or more configuration changes, and a system lockdown attribute is what indicates that the mode is active. Based at least in part on the reading of the at least one system lockdown attribute, step 334 includes determining if a system lockdown mode is enabled. If enabled, the workflow returns a failure status in step 352. If not enabled, then the workflow proceeds to step 336 which includes reading at least one IPMI bootstrap credential provisioning attribute.

Based at least in part on the at least one IPMI bootstrap credential provisioning attribute, step 338 includes determining if IPMI bootstrap credential provisioning is disabled. If disabled, the workflow returns a failure status in step 352. If not disabled, then the workflow proceeds to step 340 which includes identifying at least one available instance identifier (ID). In such an embodiment, the number of bootstrap accounts is limited to a predetermined amount (e.g., 10 bootstrap accounts). There can be multiple accounts active, and if an administrator wants to add another account, the administrator would need to use the next available (unused) instance ID. Further, by way merely of example, if the predetermined number of bootstrap accounts is 10, and there are 10 accounts active, then there would be no more available instance IDs.

Based at least in part on the at least one available instance ID identification, step 342 includes determining if the maximum allowed count (which can be, for example, predetermined and/or configured by one or more users) of bootstrap credentials has been reached. If yes (that is, the maximum allowed count has already been reached), the workflow returns a failure status in step 352. If no (that is, the maximum allowed count has not been reached), then the workflow proceeds to step 344 which includes generating a username for the bootstrap credentials. In one or more embodiments, the username is generated in the following format: IBSA<UserInstanceID><Random Number (10-digit)> (such as, for example, IBSA037492439827). As used herein, IBSA refers to a constant identifier added to the start of an account name.

Step 346 includes generating a random password for the bootstrap credentials, to be used in conjunction with the generated username. In one or more embodiments, the password can be generated using a minimum number of characters including a combination of two or more of one or more uppercase letters, one or more lowercase letters, one or more special characters, and one or more numbers (e.g., E73ug!^5O@!V^9B#, q4G#8UWi#5BV#b$#, ZyBV*Y6o76Rk5*q3, etc.). Step 348 includes updating one or more bootstrap credential attributes. For example, in at least one embodiment, updating such bootstrap credential attributes can include assigning one or more user privileges (e.g., designating which task(s) and/or operation(s) can be carried out using the bootstrap credentials), populating created user details into a corresponding remote access controller, etc.

Step 350 includes determining if the one or more bootstrap credential attributes were updated successfully. If no, the workflow returns a failure status in step 352. If yes, then the workflow proceeds to step 354 which includes returning (e.g., to at least one user) the bootstrap credentials (e.g., the generated username and password) and exiting the workflow in step 356.

Figure 4:
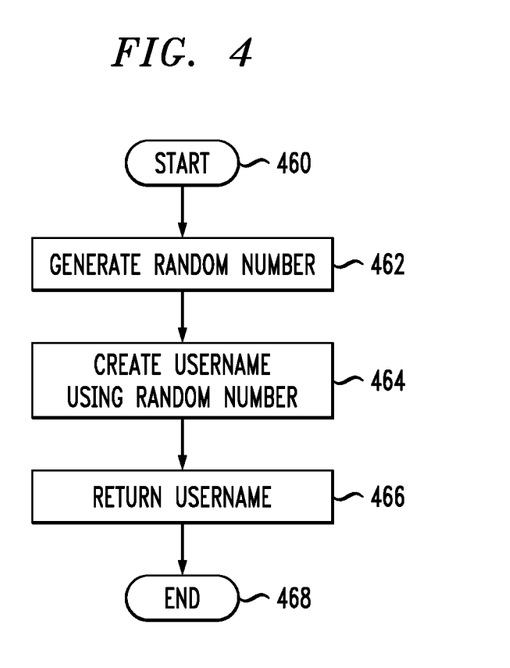
FIG. 4 shows an example workflow for bootstrap username generation in an illustrative embodiment.

FIG. 4 shows an example workflow for bootstrap username generation in an illustrative embodiment. As depicted in FIG. 4, step 460 includes starting the workflow, and step 462 includes generating a random number. In one or more embodiments, generating a random number includes seeding a random number generator with at least one time value (e.g., (srand(time(null));)). Step 464 includes creating a username based at least in part on the random number generated in step 462. By way of example, at least one embodiment can include creating a username as a combination of IBSA, a user instance ID, and the generated random number (for example, a format such as IBSA<UserInstanceID><Random Number (10-digits)> (e.g., IBSA039342439827)). In connection with creating the username, such an embodiment can include identifying at least one available user instance ID. As also depicted in FIG. 4, step 466 includes returning the created username to at least one user, and ending the workflow in step 468.

Figure 5:
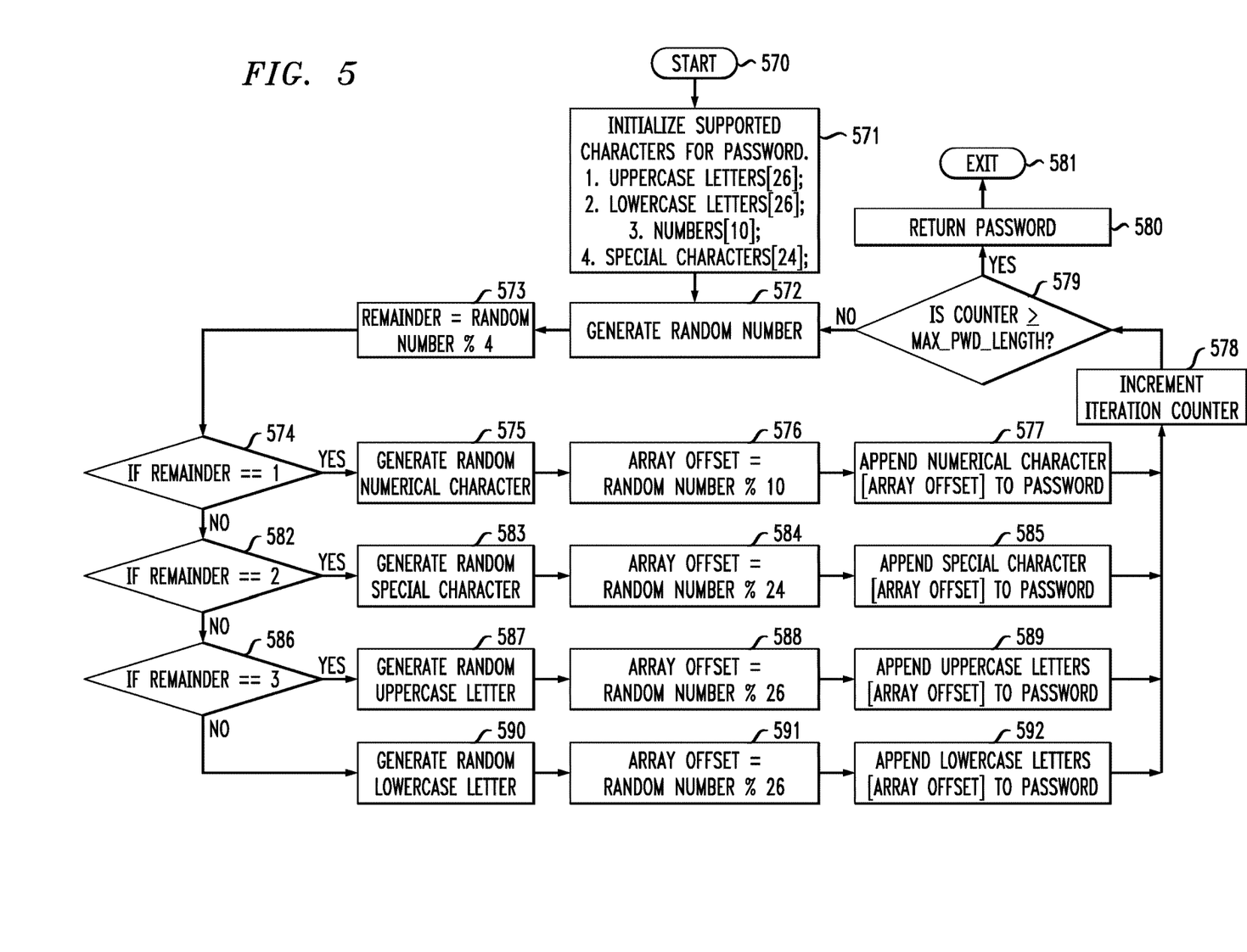
FIG. 5 shows an example workflow for bootstrap password generation in an illustrative embodiment.

FIG. 5 shows an example workflow for bootstrap password generation in an illustrative embodiment. As depicted in FIG. 5, step 570 includes starting the workflow and step 571 includes initializing supported characters for a password, wherein such supported characters can include, for example, uppercase letters (e.g., 26 possible characters "A through "Z"), lowercase letters (e.g., 26 possible characters "a" through "z"), special characters (e.g., 24 possible characters including +%)>$[|!&=*,-{ ]#(?<;_}1`), and numbers (e.g., 10 possible characters including 0 through 9). Step 572 includes generating a random number (e.g., seeding a random number generator with a time value such as, for example, (srand(time(null));)), and step 573 includes determining a remainder based on the generated random number (e.g., remainder=random number % 4, wherein % is the C modulo operator, wherein the result is the integer remainder of the argument).

Step 574 includes determining if the remainder is equal to 1. If no, then the workflow proceeds to step 582. If yes, then a random numerical character (rand( )) is generated and/or chosen in step 575, an array offset is determined in step 576 (e.g., using "rand( )%10"), and the generated and/or chosen numerical character, in conjunction with the array offset, is appended to the password in step 577. In one or more embodiments, each of the characters of the password are generated randomly from a list of numbers and/or numerical characters, uppercase letters, lowercase letters, and/or a set of special characters. To do this, such an embodiment includes generating a random numerical character and using that random numerical character to index into the particular list (e.g., take a random numerical character and % by the size of the list, and the result, as the index or offset of the list, provides a random selection from that list).

The workflow then continues to step 578, which includes incrementing an iteration counter. Additionally, step 579 then includes determining if the counter is equal to or greater than a predetermined maximum password length. If no, then the workflow returns to step 572. If yes, then the workflow proceeds to step 580 wherein the password is returned to one or more users, and step 581 wherein the workflow is exited. Accordingly, this loop is constructing a password up to the maximum length. Each iteration of the loop increases the password length by one character, and once the maximum length is reached, the function is done and the password is returned at step 580.

Step 582 includes determining if the remainder is equal to 2. If no, then the workflow proceeds to step 586. If yes, then a random special character (rand( )) is generated and/or chosen in step 583, an array offset is determined in step 584 (e.g., using "rand( )%24"), and the random special character, in conjunction with the array offset, is appended to the password in step 585. The workflow then continues to step 578, as detailed above.

Step 586 includes determining if the remainder is equal to 3. If no, then the workflow proceeds to step 590. If yes, then a random uppercase letter (rand( )) is generated and/or chosen in step 587, an array offset is determined in step 588 (e.g., using "rand( )%26"), and the random uppercase letter, in conjunction with the array offset, is appended to the password in step 589. The workflow then continues to step 578, as detailed above.

Step 590 includes generating and/or choosing a random lowercase letter (rand( )), an array offset is determined in step 591 (e.g., using "rand( )%26"), and the random lowercase letter, in conjunction with the array offset, is appended to the password in step 592. The workflow then continues to step 578, as detailed above.

Additionally, in one or more embodiments, step 572 and step 573 can be repeated until a predetermined supported password length (e.g., 16 characters) is met.

Figure 6:
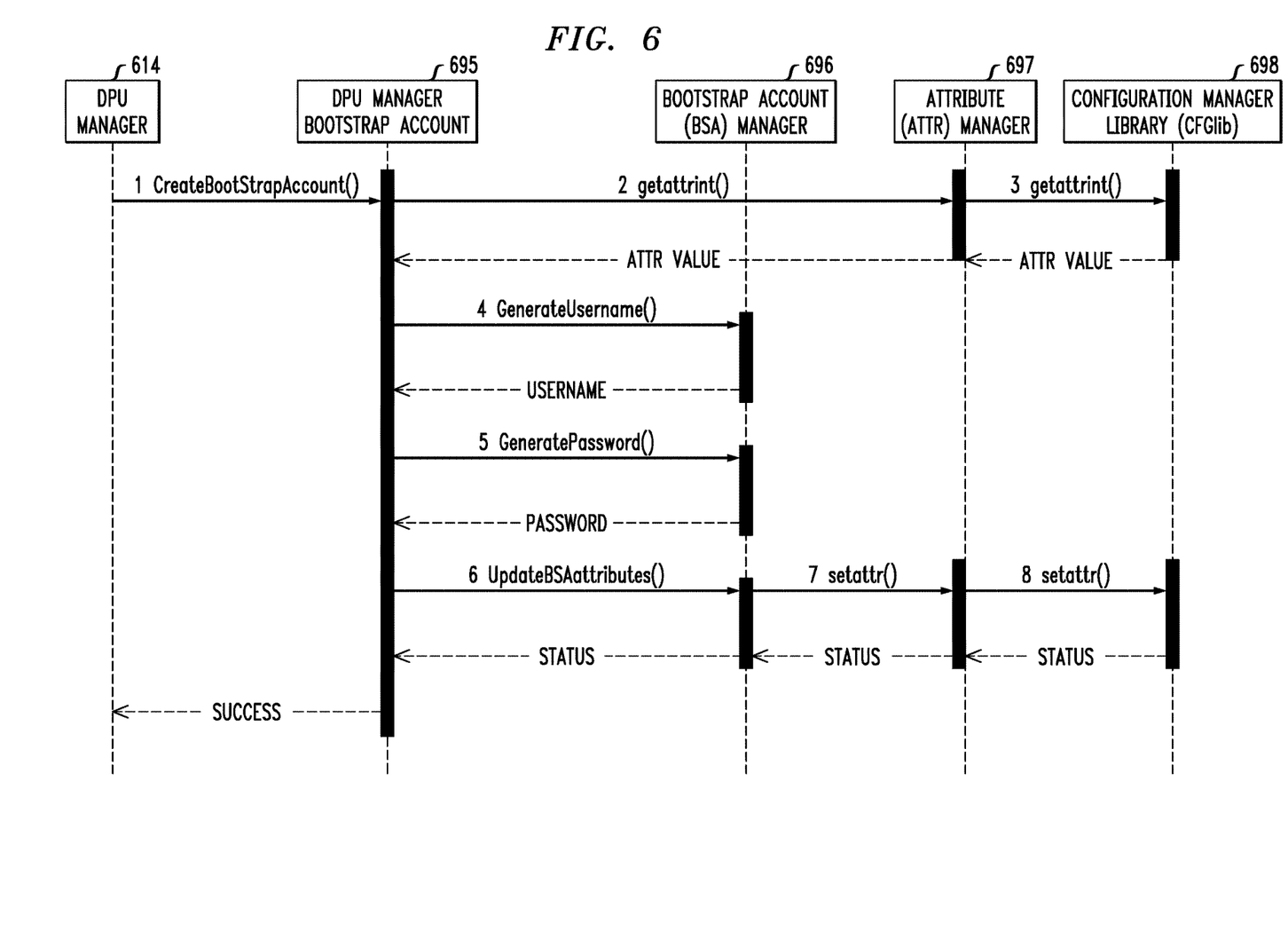
FIG. 6 shows an example component data flow diagram in an illustrative embodiment.

FIG. 6 shows an example component data flow diagram in an illustrative embodiment. By way of illustration, FIG. 6 depicts actions carried out across a DPU manager 614, DPU manager bootstrap account 695, bootstrap account (BSA) manager 696 (e.g., and application that handles requests for bootstrap accounts), attribute (Attr) manager 697, and configuration manager library (CFGlib) 698 (e.g., software which handles configuration operations on the remote access controller).

As illustrated, FIG. 6 depicts a call stack of creating a bootstrap account. In step 1, the CreateBootStrapAccount( ) method is initiated by DPU manager 614 to generate DPU manager bootstrap account 695. In step 2, the DPU manager bootstrap account 695 obtains account attributes via initiating getattrint( ) with Attr manager 697, and in step 3, Attr manager 697 initiates getattrint( ) with CFGlib 698. Attribute values are then returned from CFGlib 698 to DPU manager bootstrap account 695 via Attr manager 697. In step 4, a username is generated by DPU manager bootstrap account 695 initiating the GenerateUsername( ) method in connection with BSA manager 696, and the BSA manager 696 returns a username to DPU manager bootstrap account 695. In step 5, a password is generated by DPU manager bootstrap account 695 initiating the GeneratePassword( ) method in connection with BSA manager 696, and the BSA manager 696 returns a password to DPU manager bootstrap account 695. In step 6, BSA attributes are updated by DPU manager bootstrap account 695 initiating the UpdateBSAattributes( ) method in connection with BSA manager 696. In step 7, BSA manager 696 sets one or more attributes by initiating the setattr( ) method in connection with Attr manager 697, and in step 8, Attr manager 697 sets one or more attributes by initiating the setattr( ) method in connection with CFGlib 698. Further, a bootstrap account status is returned from CFGlib 698 to DPU manager bootstrap account 695 via Attr manager 697 and BSA manager 696. Also, a success indication is sent from DPU manager bootstrap account 695 to DPU manager 614.

Additionally, in connection with one or more embodiments, an IPMI command to create bootstrap credentials is to be supported only on a KCS in-band channel, and an IPMI will return a failure if bootstrap credentials are requested from another channel. Further, in at least one embodiment, an IPMI command will return a failure for a bootstrap credential creation request if the IPMI bootstrap credential provisioning component and/or capability is disabled.

Figure 7:
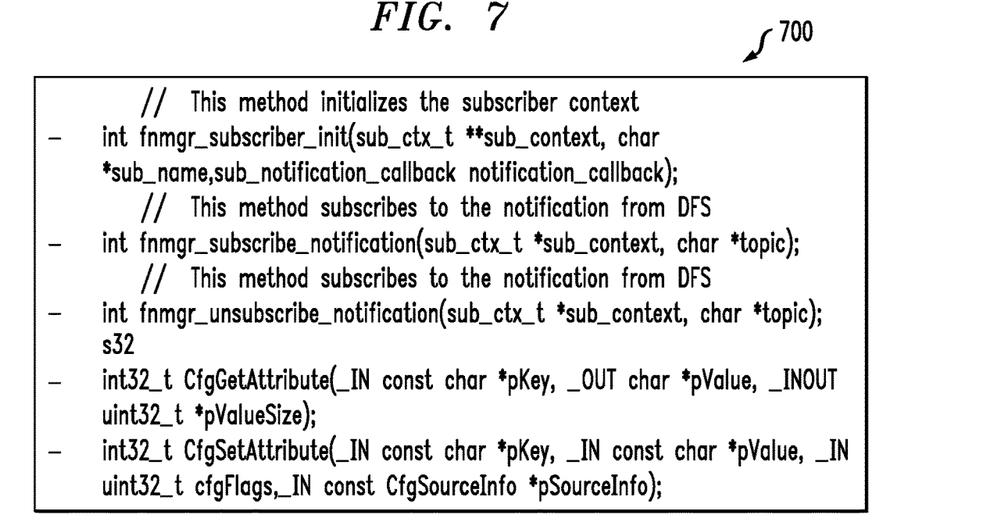
FIG. 7 shows an example set of function declarations in an illustrative embodiment.

FIG. 7 shows an example set of function declarations in an illustrative embodiment. In this embodiment, the example set of function declarations 700 can be executed by or under the control of at least one processing system and/or device. For example, the example set of function declarations 700 may be viewed as comprising a portion of a software implementation of at least part of automated user security credential generation system 105 of the FIG. 1 embodiment.

The example set of function declarations 700 illustrates three function declarations for receiving notifications from a function manager, and two function declarations for getting and setting configuration attributes.

It is to be appreciated that this particular example pseudocode shows just one example implementation of consumed interfaces, and alternative implementations of the process can be used in other embodiments.

One or more embodiments can also include implementing one or more sensitive information controls. For example, such controls can include securely storing credentials (e.g., passwords) in at least one remote access controller credential vault which is encrypted with at least one hardware key, and wherein such stored credentials are accessed only through at least one API and are not exposed to end users. Additionally, such controls can include precluding display of credentials in plaintext (e.g., precluding printing of credential data in logs and/or externally visible files), and supporting changeable credentials (e.g., clearing and/or deleting generated temporary bootstrap credentials upon every host reboot).

Figure 8:
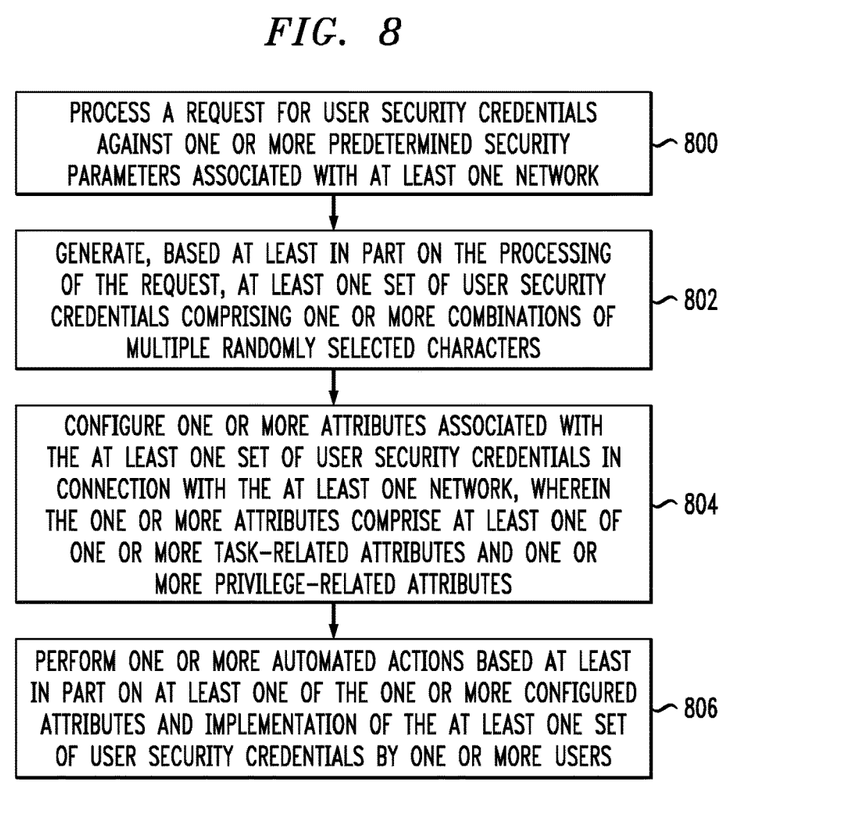
FIG. 8 is a flow diagram of a process for automatically generating task-based and limited-privilege user security credentials in an illustrative embodiment.

FIG. 8 is a flow diagram of a process for automatically generating task-based and limited-privilege user security credentials in an illustrative embodiment. It is to be understood that this particular process is only an example, and additional or alternative processes can be carried out in other embodiments.

In this embodiment, the process includes steps 800 through 806. These steps are assumed to be performed by the automated user security credential generation system 105 utilizing its elements 112, 114 and 116.

Step 800 includes processing a request for user security credentials against one or more predetermined security parameters associated with at least one network. In at least one embodiment, processing the request includes determining that the request was received via one or more predetermined interfaces. In such an embodiment, determining that the request was received via one or more predetermined interfaces can include determining that the request was received via one or more keyboard controller style interfaces between a given host and a given remote access controller. Additionally or alternatively, processing the request can include determining that at least one privileged user has explicitly enabled an operation for generating user security credentials.

Step 802 includes generating, based at least in part on the processing of the request, at least one set of user security credentials comprising one or more combinations of multiple randomly selected characters. In one or more embodiments, generating the at least one set of user security credentials includes generating a unique username and a corresponding unique password associated exclusively with the request.

Step 804 includes configuring one or more attributes associated with the at least one set of user security credentials in connection with the at least one network, wherein the one or more attributes comprise at least one of one or more task-related attributes and one or more privilege-related attributes. In at least one embodiment, configuring one or more task-related attributes associated with the at least one set of user security credentials in connection with the at least one network includes granting access, via implementation of the at least one set of user security credentials, to one or more operating system installation tasks on one or more devices. In such an embodiment, the one or more operating system installation tasks on one or more devices can include installation of at least one host operating system on at least one smart network interface card device.

Step 806 includes performing one or more automated actions based at least in part on at least one of the one or more configured attributes and implementation of the at least one set of user security credentials by one or more users. In one or more embodiments, performing one or more automated actions can include automatically granting access to at least one resource associated with the one or more privilege-related attributes upon implementation of the at least one set of user security credentials by at least one of the one or more users, and automatically denying access to at least one resource not associated with the one or more privilege-related attributes upon implementation of the at least one set of user security credentials by at least one of the one or more users. Additionally or alternatively, performing one or more automated actions can include automatically permitting performance of at least one task associated with the one or more task-related attributes upon implementation of the at least one set of user security credentials by at least one of the one or more users, and automatically precluding performance of at least one task not associated with the one or more task-related attributes upon implementation of the at least one set of user security credentials by at least one of the one or more users.

The techniques depicted in FIG. 8 can also include storing the at least one set of user security credentials in at least one volatile memory component associated with the at least one network. In such an embodiment, performing one or more automated actions can include automatically removing the at least one set of user security credentials form the at least one volatile memory component subsequent to at least one of reboot of a system associated with the at least one set of user security credentials and completion of at least one task associated with the one or more task-related attributes.

Accordingly, the particular processing operations and other functionality described in conjunction with the flow diagram of FIG. 8 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to overcome problems associated with security vulnerabilities arising from implementing default and/or administrator-level credentials. These and other embodiments can effectively automatically generate transient, task-based and limited-privilege user security credentials.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 9 and 10. Although described in the context of system 100, these platforms may also be used to implement at least portions of other information processing systems in other embodiments.

Figure 9:
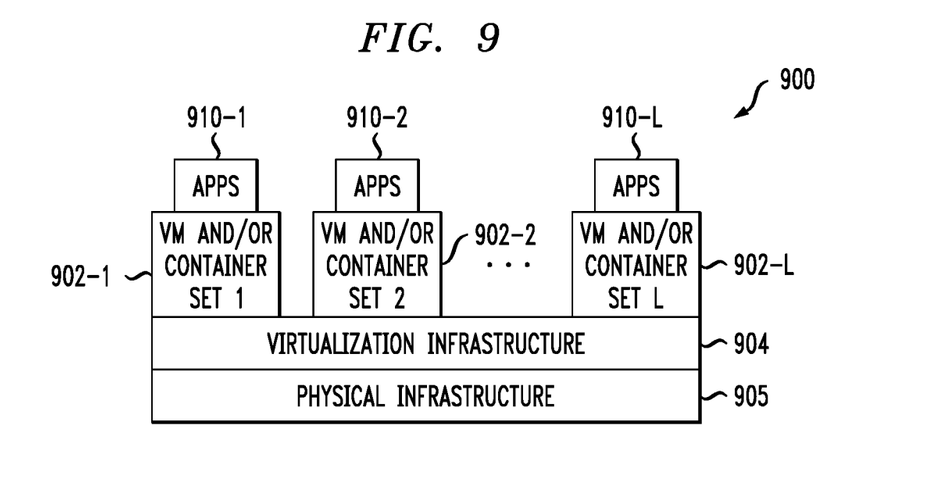
FIGS. 9 and 10 show examples of processing platforms that may be utilized to implement at least a portion of an information processing system in illustrative embodiments.
Figure 10:
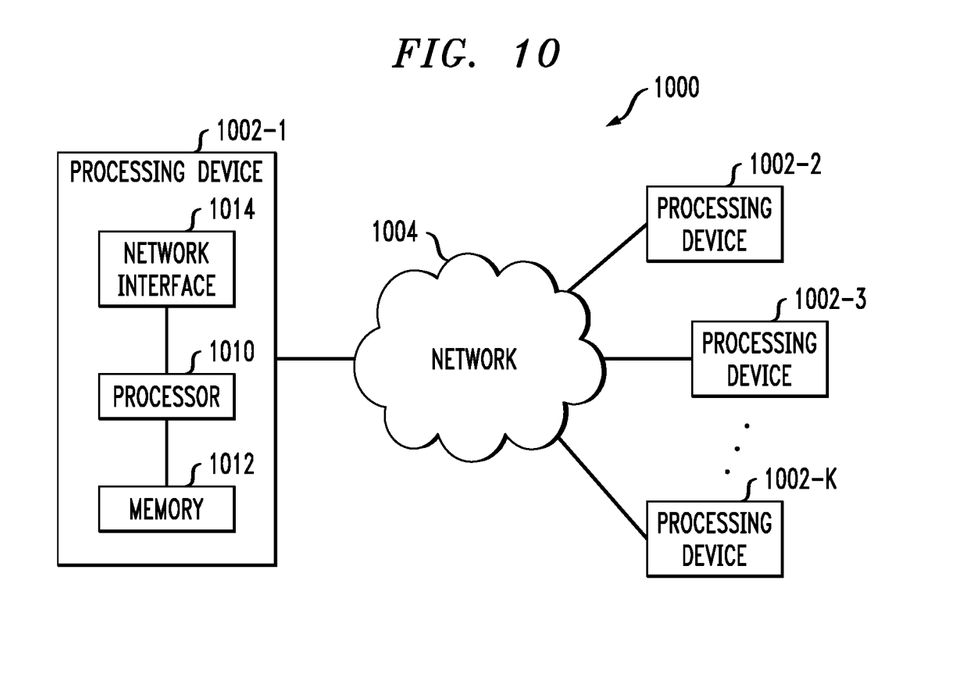

FIG. 9 shows an example processing platform comprising cloud infrastructure 900. The cloud infrastructure 900 comprises a combination of physical and virtual processing resources that are utilized to implement at least a portion of the information processing system 100. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 comprise respective VMs, respective sets of one or more containers, or respective sets of one or more containers running in VMs. In some implementations of the FIG. 9 embodiment, the VMs/container sets 902 comprise respective VMs implemented using virtualization infrastructure 904 that comprises at least one hypervisor.

A hypervisor platform may be used to implement a hypervisor within the virtualization infrastructure 904, wherein the hypervisor platform has an associated virtual infrastructure management system. The underlying physical machines comprise one or more information processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1002-1 in the processing platform 1000 comprises a processor 1010 coupled to a memory 1012.

The processor 1010 comprises a microprocessor, a CPU, a GPU, a TPU, a microcontroller, an ASIC, a FPGA or other type of processing circuitry, as well as portions or combinations of such circuitry elements.

The memory 1012 comprises random access memory (RAM), read-only memory (ROM) or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
   processing a request for user security credentials against one or more predetermined security parameters associated with at least one network;
   generating, based at least in part on the processing of the request, at least one set of user security credentials comprising one or more combinations of multiple randomly selected characters;
   configuring attributes associated with the at least one set of user security credentials in connection with the at least one network, wherein the attributes comprise one or more task-related attributes and one or more privilege-related attributes; and
   performing one or more automated actions based at least in part on at least one of the configured attributes and implementation of the at least one set of user security credentials by one or more users, wherein performing one or more automated actions comprises:
  storing, subsequent to configuring the attributes, the at least one set of user security credentials in at least one volatile memory component associated with the at least one network; and
  automatically removing the at least one set of user security credentials from the at least one volatile memory component at least in part responsive to completion of at least one task associated with the one or more task-related attributes, wherein the at least one task comprises provisioning one or more operating system-related resources in connection with one or more devices within the at least one network;
wherein the method is performed by at least one processing device comprising a processor coupled to a memory.

2. The computer-implemented method of claim 1, wherein processing the request comprises determining that the request was received via one or more predetermined interfaces.

3. The computer-implemented method of claim 2, wherein determining that the request was received via one or more predetermined interfaces comprises determining that the request was received via one or more keyboard controller style interfaces between a given host and a given remote access controller.

4. The computer-implemented method of claim 1, wherein performing one or more automated actions comprises automatically removing the at least one set of user security credentials from the at least one volatile memory component at least in part responsive to reboot of a system associated with the at least one set of user security credentials.

5. The computer-implemented method of claim 1, wherein configuring one or more task-related attributes associated with the at least one set of user security credentials in connection with the at least one network comprises granting access, via implementation of the at least one set of user security credentials, to one or more operating system installation tasks on one or more devices.

6. The computer-implemented method of claim 5, wherein the one or more operating system installation tasks on one or more devices comprise installation of at least one host operating system on at least one smart network interface card device.

7. The computer-implemented method of claim 1, wherein processing the request comprises determining that at least one privileged user has explicitly enabled an operation for generating user security credentials.

8. The computer-implemented method of claim 1, wherein generating the at least one set of user security credentials comprises generating a unique username and a corresponding unique password associated exclusively with the request.

9. The computer-implemented method of claim 1, wherein performing one or more automated actions comprises automatically granting access to at least one resource associated with the one or more privilege-related attributes upon implementation of the at least one set of user security credentials by at least one of the one or more users.

10. The computer-implemented method of claim 1, wherein performing one or more automated actions comprises automatically denying access to at least one resource not associated with the one or more privilege-related attributes upon implementation of the at least one set of user security credentials by at least one of the one or more users.

11. The computer-implemented method of claim 1, wherein performing one or more automated actions comprises automatically permitting performance of at least one task associated with the one or more task-related attributes upon implementation of the at least one set of user security credentials by at least one of the one or more users.

12. The computer-implemented method of claim 1, wherein performing one or more automated actions comprises automatically precluding performance of at least one task not associated with the one or more task-related attributes upon implementation of the at least one set of user security credentials by at least one of the one or more users.

13. A non-transitory processor-readable storage medium having stored therein program code of one or more software programs, wherein the program code when executed by at least one processing device causes the at least one processing device:
  to process a request for user security credentials against one or more predetermined security parameters associated with at least one network;
  to generate, based at least in part on the processing of the request, at least one set of user security credentials comprising one or more combinations of multiple randomly selected characters;
  to configure attributes associated with the at least one set of user security credentials in connection with the at least one network, wherein the attributes comprise one or more task-related attributes and one or more privilege-related attributes; and
  to perform one or more automated actions based at least in part on at least one of the configured attributes and implementation of the at least one set of user security credentials by one or more users, wherein performing one or more automated actions comprises:
    storing, subsequent to configuring the attributes, the at least one set of user security credentials in at least one volatile memory component associated with the at least one network; and
    automatically removing the at least one set of user security credentials from the at least one volatile memory component at least in part responsive to completion of at least one task associated with the one or more task-related attributes, wherein the at least one task comprises provisioning one or more operating system-related resources in connection with one or more devices within the at least one network.

14. The non-transitory processor-readable storage medium of claim 13, wherein processing the request comprises determining that the request was received via one or more predetermined interfaces.

15. The non-transitory processor-readable storage medium of claim 13, wherein performing one or more automated actions comprises automatically removing the at least one set of user security credentials from the at least one volatile memory component at least in part responsive to reboot of a system associated with the at least one set of user security credentials.

16. An apparatus comprising:
  at least one processing device comprising a processor coupled to a memory;
  the at least one processing device being configured:
    to process a request for user security credentials against one or more predetermined security parameters associated with at least one network;

to generate, based at least in part on the processing of the request, at least one set of user security credentials comprising one or more combinations of multiple randomly selected characters;

to configure attributes associated with the at least one set of user security credentials in connection with the at least one network, wherein the attributes comprise one or more task-related attributes and one or more privilege-related attributes; and to perform one or more automated actions based at least in part on at least one of the configured attributes and implementation of the at least one set of user security credentials by one or more users, wherein performing one or more automated actions comprises:

storing, subsequent to configuring the attributes, the at least one set of user security credentials in at least one volatile memory component associated with the at least one network; and automatically removing the at least one set of user security credentials from the at least one volatile memory component at least in part responsive to completion of at least one task associated with the one or more task-related attributes, wherein the at least one task comprises provisioning one or more operating system-related resources in connection with one or more devices within the at least one network.

17. The apparatus of claim 16, wherein processing the request comprises determining that the request was received via one or more predetermined interfaces.

18. The apparatus of claim 16,
wherein performing one or more automated actions comprises automatically removing the at least one set of user security credentials from the at least one volatile memory component at least in part responsive to reboot of a system associated with the at least one set of user security credentials.

19. The apparatus of claim 16, wherein configuring one or more task-related attributes associated with the at least one set of user security credentials in connection with the at least one network comprises granting access, via implementation of the at least one set of user security credentials, to one or more operating system installation tasks on one or more devices.

20. The apparatus of claim 19, wherein the one or more operating system installation tasks on one or more devices comprise installation of at least one host operating system on at least one smart network interface card device.

\* \* \* \* \*